May 1, 1923.
W. E. DUNSTON
AUTOMOBILE BUMPER
Filed Aug. 10, 1921
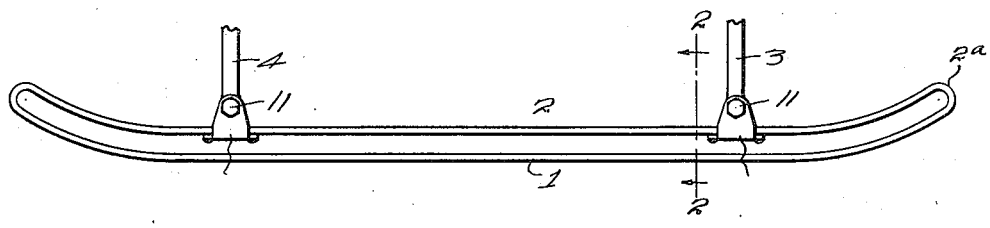
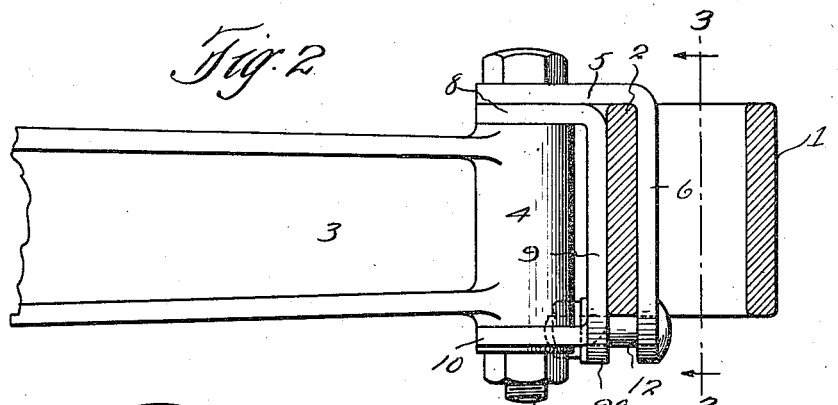
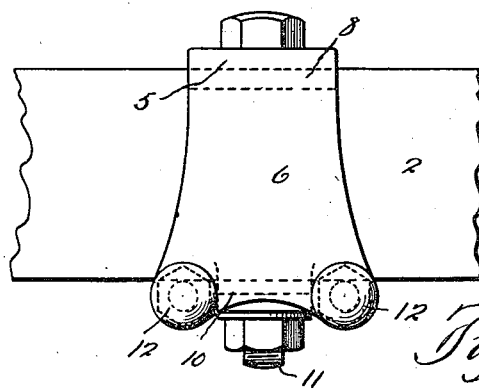
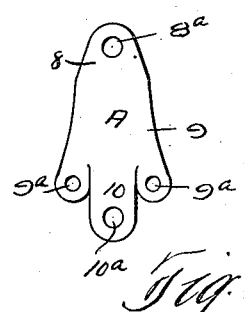
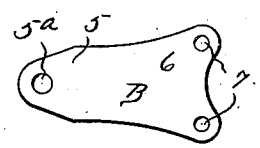
Inventor
W. E. Dunston,
By Hull, Brock & West,
Attys.

Patented May 1, 1923.

1,453,866

UNITED STATES PATENT OFFICE.

WAYNE E. DUNSTON, OF KALAMAZOO, MICHIGAN, ASSIGNOR TO CHRISTIAN GIEL, OF KALAMAZOO, MICHIGAN.

AUTOMOBILE BUMPER.

Application filed August 10, 1921. Serial No. 491,110.

*To all whom it may concern:*

Be it known that I, WAYNE E. DUNSTON, a citizen of the United States, residing at Kalamazoo, in the county of Kalamazoo and State of Michigan, have invented a certain new and useful Improvement in Automobile Bumpers, of which the following is a full, clear, and exact description, reference being had to the accompanying drawings.

This invention relates to bumpers for automobiles and similar vehicles, and more particularly to the means whereby the said bumpers are connected to and supported from the brackets or arms which in turn are supported from the front ends of the side sills of such vehicles. It is the general purpose and object of this invention to provide a connecting device for this purpose which may be conveniently and economically produced (preferably from pressed metal), and which is capable of performing its functions in an efficient manner. I accomplish the foregoing objects in and through the construction shown in the drawings forming a part hereof, wherein Fig. 1 represents a plan view of a bumper and of its supporting arms and having my invention applied thereto; Fig. 2 is an enlarged sectional detail corresponding to the line 2—2 of Fig. 1; Fig. 3 a sectional detail corresponding to the line 3—3 of Fig. 2; and Figs. 4 and 5 views in elevation of the blanks from which the two members of my fitting are constructed.

Describing the various parts herein by reference characters, 1 denotes the front bar or plate and 2 the rear bar or plate of a double bumper of the flat spring-leaf type, the front and rear bars being shown as connected by rearwardly extending curved loops 2ª. The bumper is supported from the vehicle frame (not shown) by a pair of arms, indicated at 3, each arm having at its outer end a sleeve or eye 4, the length of said sleeve or eye being approximately equal to the width of the bumper plate 2 which it supports.

For the purpose of so supporting the bumper plate from the ends of the arms 3, I employ with each arm a pair of pressed steel clamping members, the blanks for which are indicated at A and B, Figs. 4 and 5, respectively. One end 5 of the blank B is substantially triangular in outline and is provided with a single aperture while the body 6 is widened and is provided with a pair of apertures 7. The blank A is generally similar in shape to the blank B and is provided with a triangular end 8 and a body 9 similar in outline to the body 6 and having openings 8ª and 9ª adapted to register with the openings 5ª and 7, respectively. In addition, the blank B is provided with a central projection 10 also having an aperture 10ª therethrough. For convenience of description, the clamping member formed from the blank B will be referred to as the "outer" member and the clamping member formed from the blank A will be referred to as the "inner" member.

The upper or reduced end of the outer member is bent at substantially right angles to the body thereof, forming the horizontal portion 5 having the aperture 5ª and the vertical body portion 6 having the apertures 7 in the bottom thereof (see Figs. 2 and 3). The reduced upper portion of the blank A is bent at substantially right angles to the body thereof, forming the horizontal portion 8 having the aperture 8ª therein while the body portion 9 extends vertically, having the apertures 9ª therein adapted to register with the apertures 7. The tongue 10 is bent horizontally, as indicated in Figs. 2 and 3, with its aperture 10ª in substantially vertical alignment with the apertures 5ª and 8ª.

The inner U-shaped member (comprising the parts 8, 9 and 10) will be slipped upon the sleeve or eye 4 with the holes 8ª and 10ª registering with the bore of said sleeve. The bumper 2 will be applied to the vertical body portion 9 and the outer clamping member will be applied in the manner shown in the drawing, with its horizontal portion 5 resting upon the portion 8 of the other member and the hole 5ª in register with the holes 8ª and 10ª. This will enable the bolt 11 to be inserted through the holes 5ª, 8ª, the sleeve 4, and the hole 10ª, the bolts serving to secure both members of the clamp to the said sleeve. Bolts 12 will then be inserted through the aligned openings 7 and 9ª, the depth of the vertically extending slot provided between the parts 9 and 6, from the part 5 to the said bolts, being equal to the width of the bumper plate, whereby the top of the plate can bear against the horizontal portion 5 of the outer member while its bottom is supported upon the bolts 12.

It will be understood that the bumper shown herein is merely illustrative and that my clamping device may be employed with other and various forms of bumpers without avoiding the spirit of my invention.

Having thus described my invention, what I claim is:

1. The combination, with a member having a sleeve or eye thereon, of a bumper bar and means for securing the same to said sleeve or eye, the said means comprising an inner U-shaped member adapted to receive said sleeve or eye between the ends thereof and having openings in such ends adapted to register with the bore of such sleeve or eye, an outer L-shaped member having in one of its branches an opening adapted to register with the opening in the first mentioned member, a bolt extending through said sleeve or eye and said openings, and one or more bolts connecting the intermediate portion of the first member and the other branch of the second member, the body portion of the second member being spaced from the body portion of the first member to provide a space therebetween for the reception of said bar.

2. The combination, with an arm having a sleeve or eye thereon, of a bumper bar and means for securing the same to said sleeve or eye, the said means comprising an inner U-shaped member adapted to receive said sleeve or eye between the ends thereof and having openings in such ends adapted to register with the bore of such sleeve or eye, an outer L-shaped member having in one of its branches an opening adapted to register with the opening in the first mentioned member and shaped and proportioned to provide a slot with the first member, a bolt extending through said sleeve or eye and said openings, and means connecting the intermediate portion of the first member and the other branch of the second member.

3. The combination, with an arm having a sleeve or eye thereon, of a bumper bar and means for securing the same to said sleeve or eye, the said means comprising an inner U-shaped member adapted to receive said sleeve or eye between the ends thereof and having openings in such ends adapted to register with the bore of such sleeve or eye, an outer member comprising a body portion and a portion bent at an angle thereto and provided with an opening adapted to register with the openings in the first member, the second portion of the second member being of greater length than the corresponding end portion of the first member to provide a slot therewith, the body portions of said members being provided with aligned apertures, and one or more bolts in said apertures connecting the body portions of said member.

4. The combination, with an arm having a sleeve or eye thereon, of a bumper bar and means for securing the same to said sleeve or eye, the said means comprising an inner U-shaped member adapted to receive said sleeve or eye between the upper and the lower ends thereof and having openings registering with the bore of such sleeve or eye, an outer member comprising an upper body portion and a portion bent at an angle thereto and provided with an opening adapted to register with the openings in the first member, the upper portion of the second member being of greater length than the upper end portion of the first member to provide a vertical slot therewith, the body portions of said members being provided with aligned apertures in the lower ends thereof, and one or more bolts in said apertures connecting the body portions of said member and extending across the bottom of said slot.

5. The combination, with an arm having a sleeve or eye thereon, of a bumper bar and means for securing the same to said sleeve or eye, the said means comprising an inner U-shaped member adapted to receive said sleeve or eye between the ends thereof and having openings in such ends adapted to register with the bore of such sleeve or eye, the lower end of the body of said member having one or more apertures therethrough, an L-shaped outer member having an upper portion adapted to overlap the upper end of the first member and provided with an aperture adapted to register with the aperture in such first member and having a body portion spaced from the body portion of the first member and provided at its lower end with one or more apertures adapted to register with the aperture or apertures in the body of the first member and bolts extending through apertures in the bodies of the said members.

6. The combination, with an arm having a sleeve or eye thereon, of a bumper bar and means for securing the same to said sleeve or eye, said means comprising a member adapted to be secured to opposite ends of said sleeve or eye and a second member adapted to be secured at one end to said sleeve or eye and to the first member and to form a space with the first member for the reception of said bar, and means for clamping the said members against said bar and the other end of the second member to the corresponding part of the first member.

In testimony whereof, I hereunto affix my signature.

WAYNE E. DUNSTON.